US011677794B2

(12) United States Patent
Beckham, Jr.

(10) Patent No.: US 11,677,794 B2
(45) Date of Patent: *Jun. 13, 2023

(54) TECHNOLOGIES FOR MULTI-USER INTERACTIVE MEDIA STREAMING

(71) Applicant: Merge In, LLC, Cincinnati, OH (US)

(72) Inventor: Stephen Beckham, Jr., Cincinnati, OH (US)

(73) Assignee: Merge In, LLC, Cincinnati, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/407,445

(22) Filed: Aug. 20, 2021

(65) Prior Publication Data
US 2022/0046073 A1  Feb. 10, 2022

Related U.S. Application Data

(63) Continuation of application No. 16/138,892, filed on Sep. 21, 2018, now Pat. No. 11,128,687, which is a continuation of application No. 15/682,962, filed on Aug. 22, 2017, now abandoned, which is a continuation of application No. 14/630,016, filed on Feb. 24, 2015, now abandoned.

(60) Provisional application No. 61/954,376, filed on Mar. 17, 2014, provisional application No. 61/944,391, filed on Feb. 25, 2014.

(51) Int. Cl.
H04L 65/60 (2022.01)
H04L 65/611 (2022.01)

(52) U.S. Cl.
CPC ............ H04L 65/60 (2013.01); H04L 65/611 (2022.05)

(58) Field of Classification Search
CPC .............................. H04L 65/60; H04L 65/611
See application file for complete search history.

(56) References Cited

U.S. PATENT DOCUMENTS

| 9,584,834 B1* | 2/2017 | Bush ................ H04N 21/25841 |
| 2013/0312041 A1* | 11/2013 | Gresta ................ H04N 7/17318 725/116 |
| 2014/0160223 A1* | 6/2014 | Bieselt ............. H04N 21/23412 348/14.03 |

(Continued)

Primary Examiner — Glenton B Burgess
Assistant Examiner — Patrick F Ngankam
(74) Attorney, Agent, or Firm — Ulmer & Berne

(57) ABSTRACT

Technologies for streaming multi-user broadcasts include a broadcast management server configured to receive multimedia data captured of a user. The broadcast management server streams a multimedia broadcast including the multimedia data captured of the user to other users. Additionally, the broadcast management server is configured to receive a request to participate in the streamed multimedia broadcast from another user. Multimedia data captured of the other user is received in response to a determination that the request to participate in the streamed multimedia broadcast is accepted. The broadcast management server merges the multimedia data captured of the first and second users to generate a merged multimedia broadcast, which is streamed to other users. The broadcast management server also generates a broadcast feed for users. The broadcast feed includes streaming multimedia broadcasts and streaming merged multimedia broadcasts corresponding to other users. Other embodiments are described and claimed.

14 Claims, 9 Drawing Sheets

(56) References Cited

U.S. PATENT DOCUMENTS

2015/0022625 A1* 1/2015 Thapa ................ H04L 65/4038
348/14.08

* cited by examiner

TECHNOLOGIES FOR MULTI-USER INTERACTIVE MEDIA STREAMING

REFERENCE TO RELATED APPLICATIONS

This application is a continuation of U.S. Non-Provisional patent application Ser. No. 16/138,892, entitled TECHNOLOGIES FOR MULTI-USER INTERACTIVE MEDIA STREAMING and filed Sep. 21, 2018, which is a continuation of U.S. Non-Provisional patent application Ser. No. 15/682,962, entitled TECHNOLOGIES FOR MULTI-USER INTERACTIVE MEDIA STREAMING, filed Aug. 22, 2017, which is a continuation of U.S. Non-Provisional application Ser. No. 14/630,016, entitled TECHNOLOGIES FOR MULTI-USER INTERACTIVE MEDIA STREAMING, filed Feb. 25, 2015, which claims priority to U.S. Provisional Patent Application No. 61/944,391, entitled INTERACTIVE MEDIA STREAMING SYSTEMS AND METHODS, filed Feb. 25, 2014, and U.S. Provisional Patent Application No. 61/954,376, entitled SYSTEMS AND METHODS FOR INTERACTIVE MEDIA STREAMING, filed on Mar. 17, 2014, each of which is hereby incorporated herein by reference in its entirety.

TECHNICAL FIELD

Embodiments of the technologies described herein relate, in general, to media streaming technologies, and in particular to an electronic platform for multi-user interactive media streaming.

BACKGROUND

Online collaboration and social media are becoming ubiquitous tools for personal, business, and social uses. For example, organizations may utilize various online collaboration and social media tools to, among other things, conduct meetings and webinars, provide online training or eLearning opportunities to employees and other interested individuals, remotely demonstrate products or services to prospective and existing customers, and provide customer service and technical support over the Internet. Online collaboration and social media can also be used by organizations and individual users as a communication tool. For example, various social media tools such as electronic posts may be used by individual users to communicate or share information with other users. Oftentimes, such electronic posts include static or previously generated content such as graphics, electronic photographs, textual comments, and prerecorded video content. That is, electronic posts are often static one-way posts that offer other users little opportunity to interact therewith.

BRIEF DESCRIPTION OF THE DRAWINGS

The present disclosure will be more readily understood from a detailed description of some example embodiments taken in conjunction with the following figures in which.

SUMMARY

Figure 1:
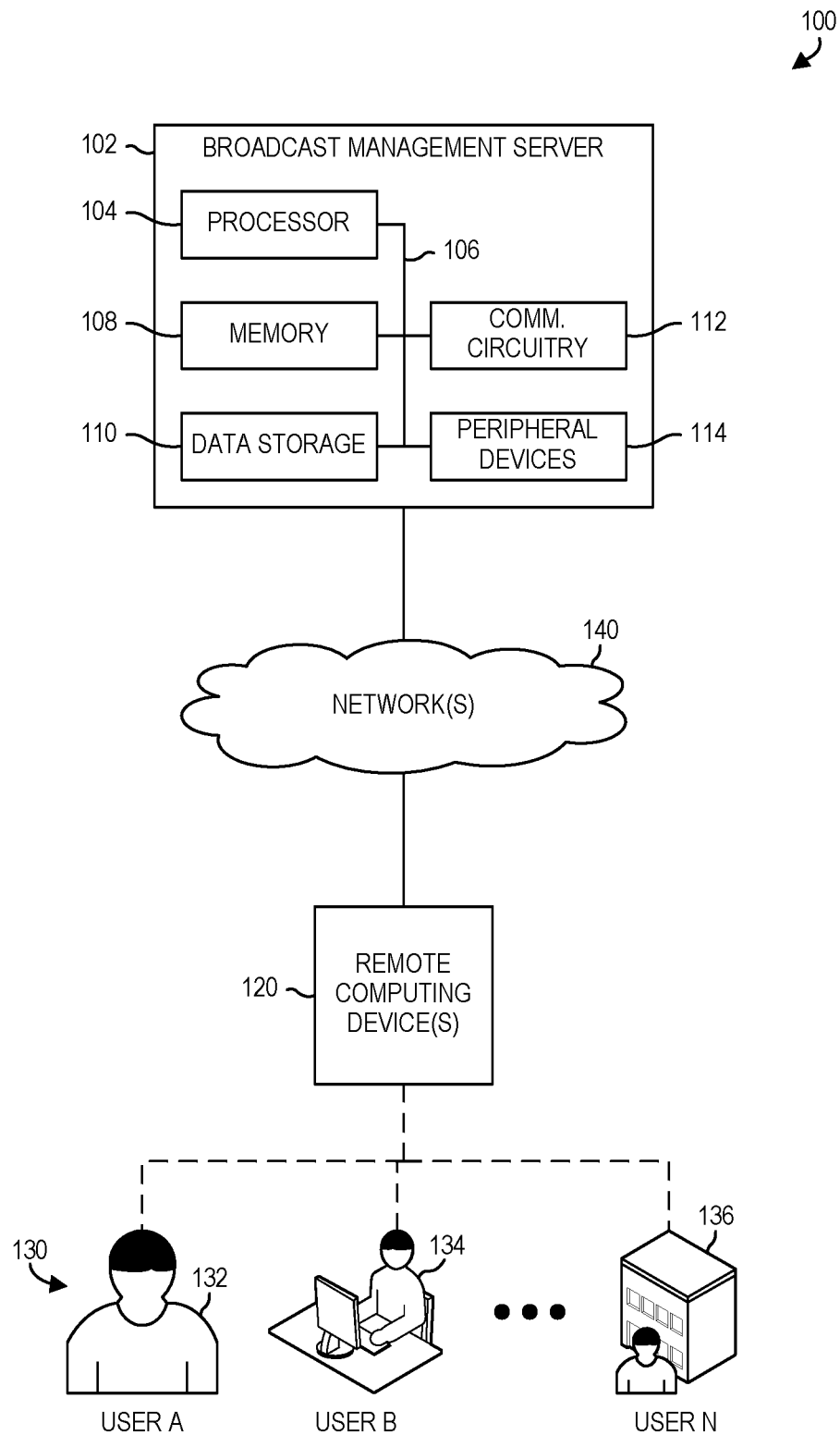
FIG. 1 is a simplified block diagram of at least one embodiment of a system for streaming interactive multi-user broadcasts.

A broadcast management server for streaming multi-user broadcasts includes a broadcast management module configured to receive multimedia data captured of a first user from a first remote computing device and a broadcast streaming module configured to stream a multimedia broadcast including the multimedia data captured of the first user. The broadcast management module is further configured to receive a request to participate in the streamed multimedia broadcast from a second remote computing device and determine whether the request to participate in the streamed multimedia broadcast is accepted. The broadcast management module is also configured to receive, from the second remote computing device, multimedia data captured of a second user in response to a determination that the request to participate in the streamed multimedia broadcast is accepted and merge the multimedia data captured of the first user and the multimedia data captured of the second user to generate a merged multimedia broadcast. The broadcast streaming module is further configured to stream the merged multimedia broadcast.

In an embodiment, the broadcast management module is further configured to determine whether the request to participate in the streamed multimedia broadcast is transferred to a hold queue and suppress the request to participate in the streamed multimedia broadcast in response to a determination that the request to participate is transferred to the hold queue. In another embodiment, the broadcast management module is further configured to prevent participation in the streamed multimedia broadcast in response to a determination that the request to participate in the streamed multimedia broadcast is not accepted.

In an another embodiment, the broadcast management module is further to receive an invitation to participate in the streamed multimedia broadcast from the first remote computing device, forward the invitation to participate in the streamed multimedia broadcast to a third remote computing device, and determine whether the invitation to participate in the streamed multimedia broadcast is accepted. In such embodiment, the broadcast management module is further configured to receive, from the third remote computing device, multimedia data captured of a third user in response to a determination that the invitation to participate in the streamed multimedia broadcast is accepted. Additionally, in such embodiment, to merge the multimedia data captured of the first user and the multimedia data captured of the second user includes to merge the multimedia data captured of the first user, the multimedia data captured of the second, and the multimedia data captured of the third user to generate the merged multimedia broadcast.

In an embodiment, the broadcast management server further includes a contact management module configured to generate a contact list that corresponds to the first user. The contact list includes contacts retrieved from at least one of a data storage of the first remote computing device, a social media account associated with the first user, or a data storage of the broadcast management server. The contact management module is further configured to transmit the contact list to the first remote computing device. In such embodiment, the invitation to participate in the streamed multimedia broadcast received from the first remote computing device includes recipient data indicative of a contact selected from the contact list to which the invitation is directed and the selected contact is the third user.

In an embodiment, the multimedia data captured of the first user and the multimedia data captured of the second user include live video data captured of the first and second users. In an embodiment, to merge the multimedia data captured of the first user and the multimedia data captured of the second user includes to merge the live video data captured of the first user and the live video data captured of the second user to generate a merged live video stream including a plurality of frames. In such embodiment, each frame of the merged live video stream is split into a first frame portion and a second frame portion. The first frame portion of each frame includes the live video data captured of the first user and the second frame portion includes the live video data captured of the second user. Additionally, in such embodiment, to stream the merged multimedia broadcast includes to stream the merged live video stream.

In an embodiment, the broadcast management server further includes a marketing management module configured to receive, from the first remote computing device, a request to advertise the multimedia broadcast including the multimedia data captured of the first user. In such embodiment, the marketing management module is further configured to determine one or more users to advertise the multimedia broadcast to as a function of user profile data corresponding to each user and add the multimedia broadcast to a broadcast feed of each of the determined one or more users. In an embodiment, the broadcast management server further includes a broadcast feed generation module configured to determine users that a third user is following. In such embodiment, the broadcast feed generation module is further configured to generate a broadcast feed for the third user. The broadcast feed includes at least one of a streaming multimedia broadcast for one or more of the determined users or a streaming merged multimedia broadcast for one or more of the determined users.

One or more machine-readable storage media include a plurality of instructions stored thereon that in response to being executed by a broadcast management server, cause the broadcast management server to receive multimedia data captured of a first user from a first remote computing device and stream a multimedia broadcast including the multimedia data captured of the first user. The plurality of instructions further cause the broadcast management server to receive a request to participate in the streamed multimedia broadcast from a second remote computing device, determine whether the request to participate in the streamed multimedia broadcast is accepted, and receive, from the second remote computing device, multimedia data captured of a second user in response to a determination that the request to participate in the streamed multimedia broadcast is accepted. The plurality of instructions also cause the broadcast management server to merge the multimedia data captured of the first user and the multimedia data captured of the second user to generate a merged multimedia broadcast and stream the merged multimedia broadcast.

In an embodiment, the plurality of instructions further cause the broadcast management server to determine whether the request to participate in the streamed multimedia broadcast is transferred to a hold queue and suppress the request to participate in the streamed multimedia broadcast in response to a determination that the request to participate is transferred to the hold queue. In another embodiment, the plurality of instructions further cause the broadcast management server to prevent participation in the streamed multimedia broadcast in response to a determination that the request to participate in the streamed multimedia broadcast is not accepted.

In another embodiment, the plurality of instructions further cause the broadcast management server to receive an invitation to participate in the streamed multimedia broadcast from the first remote computing device, forward the invitation to participate in the streamed multimedia broadcast to a third remote computing device, and determine whether the invitation to participate in the streamed multimedia broadcast is accepted. In such embodiment, the plurality of instructions further cause the broadcast management server to receive, from the third remote computing device, multimedia data captured of a third user in response to a determination that the invitation to participate in the streamed multimedia broadcast is accepted. Additionally, in such embodiment, to merge the multimedia data captured of the first user and the multimedia data captured of the second user includes to merge the multimedia data captured of the first user, the multimedia data captured of the second, and the multimedia data captured of the third user to generate the merged multimedia broadcast.

In an embodiment, the plurality of instructions further cause the broadcast management server to generate a contact list corresponding to the first user. The contact list includes contacts retrieved from at least one of a data storage of the first remote computing device, a social media account associated with the first user, or a data storage of the broadcast management server. The plurality of instructions further cause the broadcast management server to transmit the contact list to the first remote computing device. In such embodiment, the invitation to participate in the streamed multimedia broadcast received from the first remote computing device includes recipient data indicative of a contact selected from the contact list to which the invitation is directed and the selected contact is the third user.

In an embodiment, the multimedia data captured of the first user and the multimedia data captured of the second user include live video data captured of the first and second users. In an embodiment, to merge the multimedia data captured of the first user and the multimedia data captured of the second user includes to merge the live video data captured of the first user and the live video data captured of the second user to generate a merged live video stream including a plurality of frames. In such embodiment, each frame of the merged live video stream is split into a first frame portion and a second frame portion. The first frame portion of each frame includes the live video data captured of the first user and the second frame portion includes the live video data captured of the second user. Additionally, in such embodiment, to stream the merged multimedia broadcast includes to stream the merged live video stream.

In an embodiment, the plurality of instructions further cause the broadcast management server to receive, from the first remote computing device, a request to advertise the multimedia broadcast including the multimedia data captured of the first user. In such embodiment, the plurality of instructions further cause the broadcast management server to determine one or more users to advertise the multimedia broadcast to as a function of user profile data corresponding to each user and add the multimedia broadcast to a broadcast feed of each of the determined one or more users. In an embodiment, the plurality of instructions further cause the broadcast management server to determine users that a third user is following. In such embodiment, the plurality of instructions further cause the broadcast management server to generate a broadcast feed for the third user. The broadcast feed includes at least one of a streaming multimedia broadcast for one or more of the determined users or a streaming merged multimedia broadcast for one or more of the determined users.

A method for streaming multi-user broadcasts includes receiving, by a broadcast management server and from a first remote computing device, multimedia data captured of a first user. The method further includes streaming, by the broadcast management server, a multimedia broadcast including the multimedia data captured of the first user and receiving, by the broadcast management server and from a second remote computing device, a request to participate in the streamed multimedia broadcast. The method also includes determining, by the broadcast management server, whether the request to participate in the streamed multimedia broadcast is accepted. The method further includes receiving, by the broadcast management server and from the second remote computing device, multimedia data captured of a second user in response to a determination that the request to participate in the streamed multimedia broadcast is accepted. Additionally, the method includes merging, by the broadcast management server, the multimedia data captured of the first user and the multimedia data captured of the second user to generate a merged multimedia broadcast and streaming, by the broadcast management server, the merged multimedia broadcast.

In an embodiment, the method further includes determining, by the broadcast management server, whether the request to participate in the streamed multimedia broadcast is transferred to a hold queue. In such embodiment, the method also includes suppressing, by the broadcast management server, the request to participate in the streamed multimedia broadcast in response to a determination that the request to participate is transferred to the hold queue. In another embodiment, the method includes preventing, by the broadcast management server, participation in the streamed multimedia broadcast in response to a determination that the request to participate in the streamed multimedia broadcast is not accepted.

In another embodiment, the method includes receiving, by the broadcast management server and from the first remote computing device, an invitation to participate in the streamed multimedia broadcast and forwarding, by the broadcast management server, the invitation to participate in the streamed multimedia broadcast to a third remote computing device. In such embodiment, the method further includes determining, by the broadcast management server, whether the invitation to participate in the streamed multimedia broadcast is accepted. Additionally, in such embodiment, the method also includes receiving, by the broadcast management server and from the third remote computing device, multimedia data captured of a third user in response to a determination that the invitation to participate in the streamed multimedia broadcast is accepted. Additionally, in such embodiment, merging the multimedia data captured of the first user and the multimedia data captured of the second user includes merging the multimedia data captured of the first user, the multimedia data captured of the second, and the multimedia data captured of the third user to generate the merged multimedia broadcast.

In an embodiment, the method further includes generating, by the broadcast management server, a contact list corresponding to the first user. The contact list includes contacts retrieved from at least one of a data storage of the first remote computing device, a social media account associated with the first user, or a data storage of the broadcast management server. In such embodiment, the method further includes transmitting, by the broadcast management server, the contact list to the first remote computing device. Additionally, in such embodiment, the invitation to participate in the streamed multimedia broadcast received from the first remote computing device includes recipient data indicative of a contact selected from the contact list to which the invitation is directed and the selected contact is the third user.

In an embodiment, the multimedia data captured of the first user and the multimedia data captured of the second user include live video data captured of the first and second users. In an embodiment, merging the multimedia data captured of the first user and the multimedia data captured of the second user includes merging the live video data captured of the first user and the live video data captured of the second user to generate a merged live video stream including a plurality of frames. In such embodiment, each frame of the merged live video stream is split into a first frame portion and a second frame portion. The first frame portion of each frame includes the live video data captured of the first user and the second frame portion includes the live video data captured of the second user. Additionally, in such embodiment, streaming the merged multimedia broadcast includes streaming the merged live video stream.

In an embodiment, the method includes receiving, by the broadcast management server and from the first remote computing device, a request to advertise the multimedia broadcast including the multimedia data captured of the first user. In such embodiment, the method further includes determining, by the broadcast management server, one or more users to advertise the multimedia broadcast to as a function of user profile data corresponding to each user and adding, by the broadcast management server, the multimedia broadcast to a broadcast feed of each of the determined one or more users. In an embodiment, the method includes determining, by the broadcast management server, users that a third user is following. In such embodiment, the method further includes generating, by the broadcast management server, a broadcast feed for the third user. The broadcast feed includes at least one of a streaming multimedia broadcast for one or more of the determined users or a streaming merged multimedia broadcast for one or more of the determined users.

DETAILED DESCRIPTION

Various non-limiting embodiments of the present disclosure will now be described to provide an overall understanding of the principles of the structure, function, and use of systems and methods disclosed herein. One or more examples of these non-limiting embodiments are illustrated in the selected examples disclosed and described in detail with reference made to FIGS. 1-12 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. In addition, elements illustrated in the figures are not necessarily drawn to scale for simplicity and clarity of illustration. For ease of reading and clarity, certain components, modules, or methods may be described solely in connection with a specific figure.

In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

Referring now to FIG. 1, in one embodiment, a system 100 for streaming interactive multi-user multimedia broadcasts includes a broadcast management server 102 configured to communicate with one or more remote computing devices 120 over one or more networks 140. In operation, the broadcast management server 102 may receive multimedia data captured of one user 130 (e.g., the user A 132) and stream a live multimedia broadcast including the received multimedia data to one or more other users 130 (e.g., the user B 134, the user N 136, etc.). In some embodiments, the multimedia data captured of the one user 130 (e.g., the user A 132) and the multimedia broadcast streamed to the other users 130 may be embodied as live video data and a live multimedia broadcast, respectively. Additionally, in some embodiments, the broadcast management server 102 may merge live multimedia data captured of one user 130 (e.g., the user A 132) and live multimedia data captured of another user 130 (e.g., the user B 134) and generate a merged live multimedia broadcast, which may be streamed to one or more of the users 130. In that way, the other user 130 (e.g., the user B 134) may participate and contribute live content to the live multimedia broadcast of the first user 130 (e.g., the user A 132).

In some embodiments, the broadcast management server 102 may manage membership or participation in one or more live multimedia broadcasts. For example, as discussed in more detail below, the broadcast management server 102 may allow or reject one user's 130 (e.g., the user B 134) request to join or participate in the live multimedia broadcast of another user 130 (e.g., the user A 132). In another example, the broadcast management server 102 may facilitate one user 130 (e.g., the user A 132) inviting another user 130 (e.g., the user B 134) to join or participate in their live multimedia broadcast.

Additionally or alternatively, the broadcast management server 102 may generate a new broadcasts feed (e.g., the new broadcasts feed 1200 illustratively shown in FIG. 12) for each user 130 of the system 100. In some embodiments, the new broadcasts feed 1200 generated for each user 130 may include the live multimedia broadcasts, if any, currently being streamed by each of the user's 130 contacts or other users 130 that the user 130 is following. In such embodiment, each user 130 may view, interact, and request to join any of the live multimedia broadcasts included in their new broadcasts feed 1200 via one or more of the remote computing devices 120.

The broadcast management server 102 may be embodied as any type of server or computing device capable of processing, communicating, storing, maintaining, and transferring data. For example, the broadcast management server 102 may be embodied as a server, a microcomputer, a minicomputer, a mainframe, a desktop computer, a laptop computer, a mobile computing device, a handheld computer, a smart phone, a tablet computer, a personal digital assistant, a telephony device, a custom chip, an embedded processing device, or other computing device and/or suitable programmable device. In some embodiments, the broadcast management server 102 may be embodied as a computing device integrated with other systems or subsystems. In the illustrative embodiment of FIG. 1, the broadcast management server 102 includes a processor 104, a system bus 106, a memory 108, a data storage 110, communication circuitry 112, and one or more peripheral devices 114. Of course, the broadcast management server 102 may include other or additional components, such as those commonly found in a server and/or computer (e.g., various input/output devices), in other embodiments. Additionally, in some embodiments, one or more of the illustrative components may be incorporated in, or otherwise from a portion of, another component. For example, the memory 108, or portions thereof, may be incorporated in the processor 104 in some embodiments. Furthermore, it should be appreciated that the broadcast management server 102 may include other components, sub-components, and devices commonly found in a computer and/or computing device, which are not illustrated in FIG. 1 for clarity of the description.

The processor 104 may be embodied as any type of processor capable of performing the functions described herein. For example, the processor 104 may be embodied as a single or multi-core processor, a digital signal processor, microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or other processor or processing/controlling circuit or controller.

In various configurations, the broadcast management server 102 includes a system bus 106 for interconnecting the various components of the broadcast management server 102. The system bus 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations with the processor 104, the memory 108, and other components of the broadcast management server 102. In some embodiments, the broadcast management server 102 can be integrated into one or more chips such as a programmable logic device or an application specific integrated circuit (ASIC). In such embodiments, the system bus 106 may form a portion of a system-on-a-chip (SoC) and be incorporated, along with the processor 104, the memory 108, and other components of the broadcast management server 102, on a single integrated circuit chip.

The memory 108 may be embodied as any type of volatile or non-volatile memory or data storage capable of performing the functions described herein. For example, the memory 108 may be embodied as read only memory (ROM), random access memory (RAM), cache memory associated with the processor 104, or other memories such as dynamic RAM (DRAM), static ram (SRAM), programmable ROM (PROM), electrically erasable PROM (EEPROM), flash memory, a removable memory card or disk, a solid state drive, and so forth. In operation, the memory 108 may store various data and software used during operation of the broadcast management server 102 such as operating systems, applications, programs, libraries, and drivers.

The data storage 110 may be embodied as any type of device or devices configured for short-term or long-term storage of data such as, for example, memory devices and circuits, memory cards, hard disk drives, solid-state drives, or other data storage devices. For example, in some embodiments, the data storage 110 includes storage media such as a storage device that can be configured to have multiple modules, such as magnetic disk drives, floppy drives, tape drives, hard drives, optical drives and media, magneto-optical drives and media, compact disc drives, Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth. Storage media such as flash drives, solid state hard drives, redundant array of individual disks (RAID), virtual drives, networked drives and other memory means including storage media on the processor 104, or the memory 108 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

The communication circuitry 112 of the broadcast management server 102 may be embodied as any type of communication circuit, device, interface, or collection thereof, capable of enabling communications between the broadcast management server 102 and the remote computing device(s) 120 and/or other computing devices. For example, the communication circuitry 112 may be embodied as one or more network interface controllers (NICs), in some embodiments. The communication circuitry 112 may be configured to use any one or more communication technologies (e.g., wireless or wired communications) and associated protocols (e.g., Ethernet, Wi-Fi®, WiMAX, etc.) to effect such communication.

In some embodiments, the broadcast management server 102 and the remote computing device(s) 120 and/or other computing devices may communicate with each other over the network(s) 140. The network(s) 140 may be embodied as any number of various wired and/or wireless communication networks. For example, the network(s) 140 may be embodied as or otherwise include a local area network (LAN), a wide area network (WAN), a cellular network, or a publicly-accessible, global network such as the Internet. Additionally, the network(s) 140 may include any number of additional devices to facilitate communication between the broadcast management server 102, remote computing device(s) 120, and/or other computing devices.

Additionally, in some embodiments, the broadcast management server 102 may further include one or more peripheral devices 114. Such peripheral devices 114 may include any type of peripheral device commonly found in a computing device such as additional data storage, speakers, a hardware keyboard, a keypad, a gesture or graphical input device, a motion input device, a touchscreen interface, one or more displays, an audio unit, a voice recognition unit, a vibratory device, a computer mouse, a peripheral communication device, and any other suitable user interface, input/output device, and/or other peripheral device.

The remote computing devices 120 may be embodied as any type of computing devices capable of performing the functions described herein. As such, the remote computing devices 120 may include devices and structures commonly found in computing devices such as processors, memory devices, communication circuitry, and data storages, which are not shown in FIG. 1 for clarity of the description. In some embodiments, the remote computing devices 120 are configured to send multimedia data captured of the users 130 to the broadcast management server 102. Additionally, the remote computing devices 120 are configured to receive broadcast feeds and/or multimedia broadcast streams from the broadcast management server 102. The remote computing devices 120 may also be configured to generate and transmit requests to join or participate in multimedia broadcast streams. Additionally or alternatively, the remote computing devices 120 may be configured to accept or reject an invitation to join or participate in multimedia broadcast streams. To do so, in some embodiments, the remote computing devices 120 may be configured to access or otherwise communicate with the broadcast management server 102 via one or more web pages (e.g., HTML pages, PHP pages, etc.) or a web-browser application (e.g., an HTML application or the like). For example, in such embodiments, a user 130 may utilize a web-browser executing on one of the remote computing devices 120 such as Safari™, Opera™, Google™ Chrome™, Internet Explorer™, or the like to interact with the broadcast management server 102.

Figure 2:
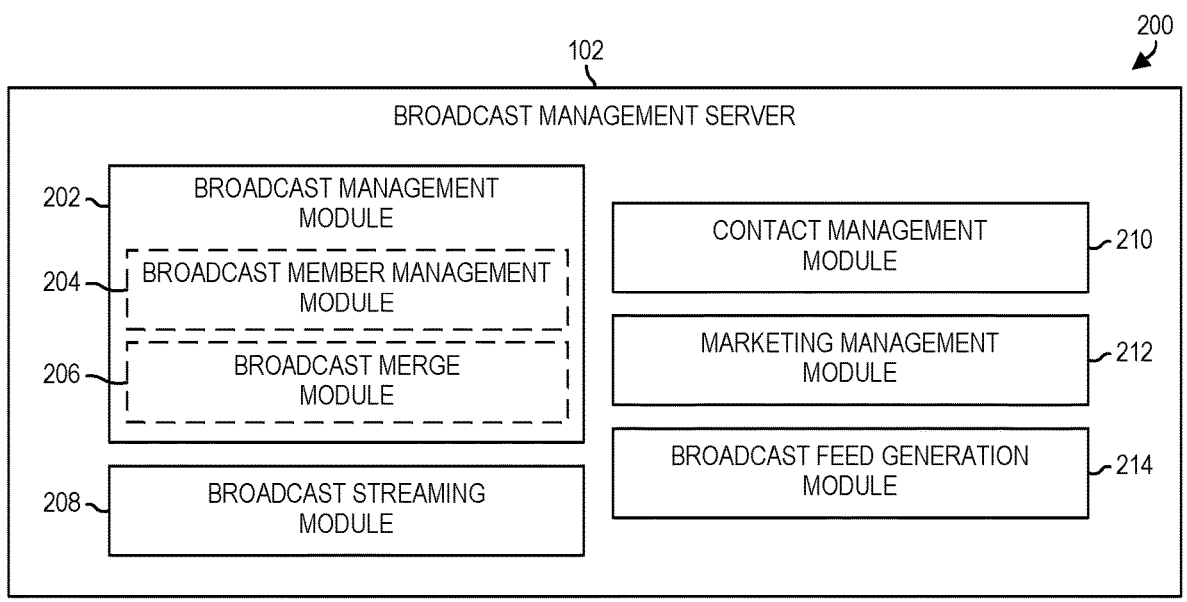
FIG. 2 is a simplified block diagram of at least one embodiment of an environment that may be executed by the broadcast management server of FIG. 1.

Referring now to FIG. 2, in the illustrative embodiment, the broadcast management server 102 establishes an environment 200 during operation. The illustrative environment 200 includes a broadcast management module 202, a broadcast streaming module 208, a contact management module 210, a marketing management module 212, and a broadcast feed generation module 214. In some embodiments, the broadcast management module 202 may include a broadcast member management module 204 and a broadcast merge module 206, as discussed in more detail below. The various modules of the environment 200 may be embodied as hardware, firmware, software, logic, or a combination thereof. For example, each of the modules of the environment 200 may be embodied as a processor and/or a controller configured to provide the functionality described below. Of course, it should be appreciated that the broadcast management server 102 may include other components, sub-components, modules, and devices commonly found in a computing device, which are not illustrated in FIG. 2 for clarity of the description.

The broadcast management module 202 is configured to create or initialize new multimedia broadcasts for one or more users 130. The new multimedia broadcasts may be embodied as live or previously created multimedia broadcasts. The new multimedia broadcasts may be produced natively or in a pre-rendered format suitable for viewers (e.g., via the remote computing devices 120) without software to natively render the multimedia broadcasts. In operation, the broadcast management module 202 receives broadcast settings and/or configuration options corresponding to new multimedia broadcasts via the remote computing device(s) 120. In some embodiments, the broadcast management module 202 may generate one or more interfaces (e.g., web pages, proprietary application interfaces, etc.) configured to enable one or more users 130 to provide various broadcast settings and/or configuration options associated with the new multimedia broadcasts.

The broadcast management module 202 is also configured to receive multimedia data captured of one or more of the users 130. In some embodiments, the multimedia broadcasts created or initialized by the broadcast management module 202 include the received multimedia data. The multimedia data may be embodied as any type of multimedia data including, without limitation, video data, audio data, textual data, sensor data such as GPS or temperature data, or combinations thereof. Additionally or alternatively, the multimedia data may be embodied as any other type of data that can be displayed on a computing device such as documents, schematics, or presentations. For example, in some embodiments, the multimedia data may be embodied as live video data captured of one or more of the users 130. In such embodiments, the live video data may be captured by cameras or video sensors of the remote computing devices 120 operated by the users 130. In some embodiments, the broadcast management module 202 continuously receives the live video data (or other multimedia data) from the remote computing devices 120 operated by the users 130. It should be appreciated that the broadcast management module 202 may receive the video data and/or the multimedia data periodically according to any suitable time or transmission interval.

The broadcast management module 202 is further configured to manage membership and/or participation of various multimedia broadcasts being streamed. To do so, in some embodiments, the broadcast management module 202 includes the broadcast member management module 204. In such embodiments, the broadcast member management module 204 may be configured to receive a request from one user 130 (e.g., the user B 134) to join or otherwise participate in a multimedia broadcast of another user (e.g., the user A 132). Additionally or alternatively, in some embodiments, the broadcast member management module 204 may be configured to generate an invitation by one user 130 (e.g., the user A 132) for another user 130 (e.g., the user B 134) to join or participate in a multimedia broadcast being streamed. In such embodiments, the broadcast member management module 204 may receive recipient data from the user 130 (e.g., the user A 132) indicative of a selected contact from a contact list. Thereafter, the broadcast member management module 204 may transmit an invitation to the selected user from the contact list to join or participate in the user's 130 multimedia broadcast.

In some embodiments, the broadcast member management module 204 may further be configured to determine whether to allow or prevent a user 130 from joining or participating in a multimedia broadcast of another user 130. For example, in some embodiments, the broadcast member management module 204 may be configured to determine whether a user 130 (e.g., the user A 132), associated with a multimedia broadcast being streamed, accepts or rejects another user's 130 (e.g., the user B 134) request to join or participate in the multimedia broadcast. Additionally or alternatively, the broadcast member management module 204 may also transfer or suppress requests from users 130 to join or participate in a multimedia broadcast of a particular user 130 to a holding queue.

The broadcast management module 202 is further configured to merge multimedia data to generate a merged multimedia broadcast. To do so, in some embodiments, the broadcast management module 202 includes the broadcast merge module 206. In such embodiments, the broadcast merge module 206 may be configured to merge multimedia data captured of one user 130 with multimedia captured of another user 130 to generate the merged multimedia broadcast. For example, in some embodiments, the broadcast merge module 206 may be configured to merge multimedia data captured of the user A 132 with multimedia data captured of the user B 134 and generate the merged multimedia broadcast. In embodiments in which the multimedia data captured of the user A 132 and the multimedia data captured of the user B 134 is embodied as live video data, the merged multimedia broadcast generated by the broadcast merge module 206 may be embodied as a merged live video stream. In such embodiments, the merged live video stream includes a plurality of frames. Each frame of the merged live video stream may be split into a first frame portion and a second frame portion. In some embodiments, the first frame portion of each frame may include the live video data captured of the user A 132 and the second frame portion may include the live video data captured of the user B 134.

The broadcast streaming module 208 is configured to stream multimedia broadcasts to the one or more users 130. To do so, the broadcast streaming module 208 may stream, or otherwise transmit, the multimedia broadcasts to the remote computing devices 120 of the users 130. In some embodiments, the multimedia broadcasts streamed to the users 130 are embodied as single-user multimedia broadcasts. That is, each multimedia broadcast streamed to the users 130 includes multimedia data captured of one user 130. Additionally or alternatively, the multimedia broadcasts streamed to the users 130 are embodied as multi-user multimedia broadcasts. That is, each multimedia broadcast streamed to the users 130 includes multimedia data captured of more than one user 130. It should be appreciated that the multimedia broadcasts streamed to the users 130 may also be embodied as any combination of single-user and multi-user multimedia broadcasts.

The contact management module 210 is configured to manage contacts for each of the users 130. For example, in some embodiments, the contact management module 210 generates a contact list for each user 130. The contact list generated for a particular user 130 may include contacts (e.g., other users 130) retrieved from a data storage of the remote computing device 120 utilized by the user 130, the data storage 110 of the broadcast management server 102, and/or one or more social media accounts of the user 130. In some embodiments, the contact management module 210 may transmit the contact list to the remote computing device 120 utilized by the user 130. In some embodiments, the contact list may be used by the user 130 to select a contact (e.g., another user 130) to which an invitation to participate or join in a multimedia broadcast should be sent.

The marketing management module 212 is configured to manage advertising options for multimedia broadcast streams. For example, in some embodiments, the marketing management module 212 may be configured to receive a request from a user 130 (e.g., the user A 132) to advertise a multimedia broadcast stream. In such embodiments, the marketing management module 212 may be configured to determine one or more other users 130 to which the multimedia broadcast stream should be advertised based on profile data associated with each of the other users 130. For example, the marketing management module 212 may determine whether to advertise a multimedia broadcast stream based on one or more user preferences, political affiliations, music preferences, religious beliefs, fashion preferences, favorite sports teams, user location data, user gender data, user age data, or any other type of data suitable for determining one or more users 130 to which the multimedia broadcast stream should be advertised. In some embodiments, the multimedia broadcast stream may be added to a broadcasts feed for each of the determined users 130.

Figure 12:
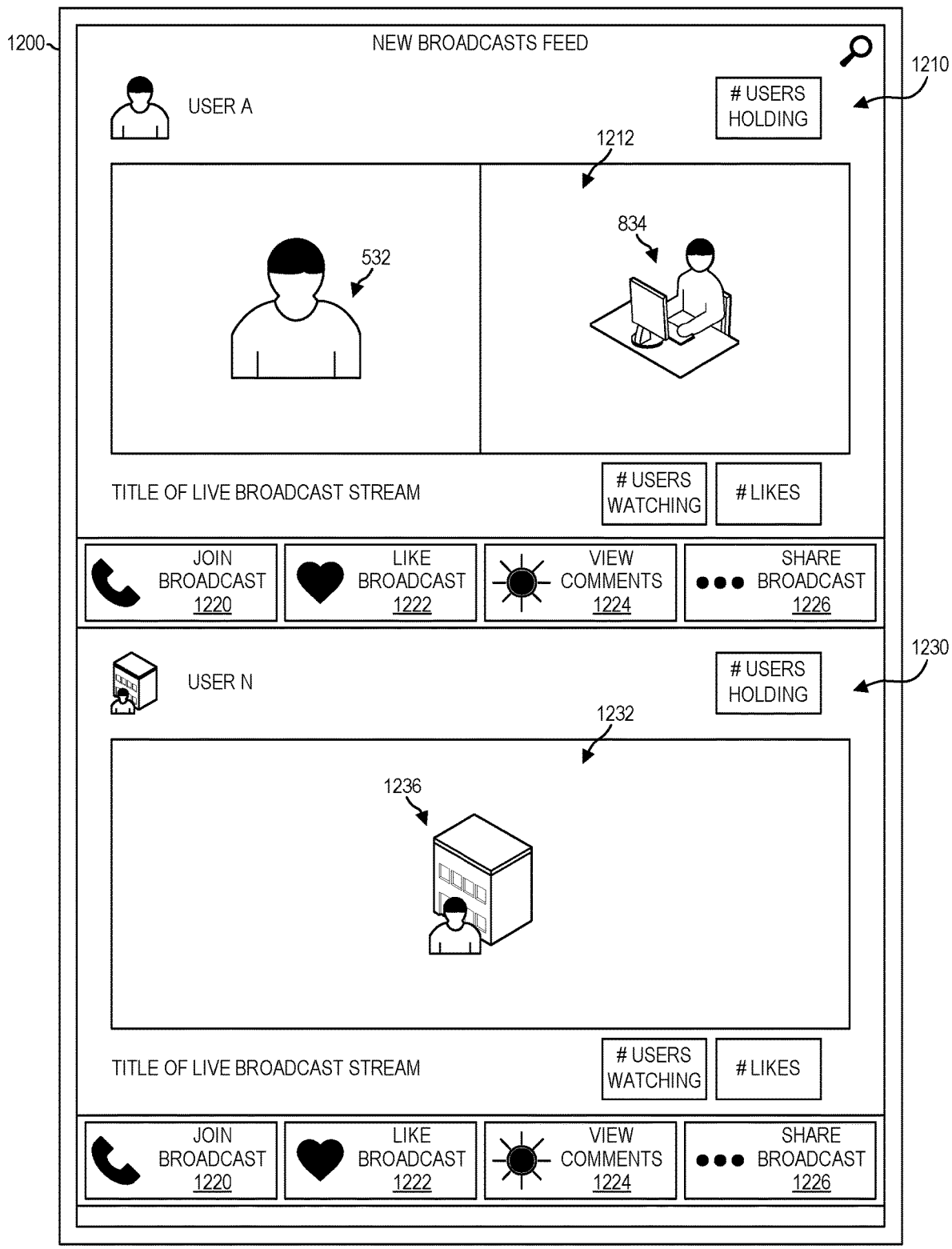
FIG. 12 is an exemplary broadcast feed interface that may be generated by the broadcast management server of FIGS. 1 and 2.

The broadcast feed generation module 214 is configured to generate a new broadcasts feed for each user 130 (e.g., the new broadcasts feed 1200 illustratively shown in FIG. 12). The new broadcasts feed 1200 generated for each user 130 includes the multimedia broadcasts being streamed by each of the user's 130 contacts. That is, in some embodiments, the new broadcasts feed 1200 for a particular user 130 (e.g., the user A 132) includes the multimedia broadcasts being streamed by each contact (e.g., other user 130) being followed by that user 130 (e.g., the user A 132).

Figure 3:
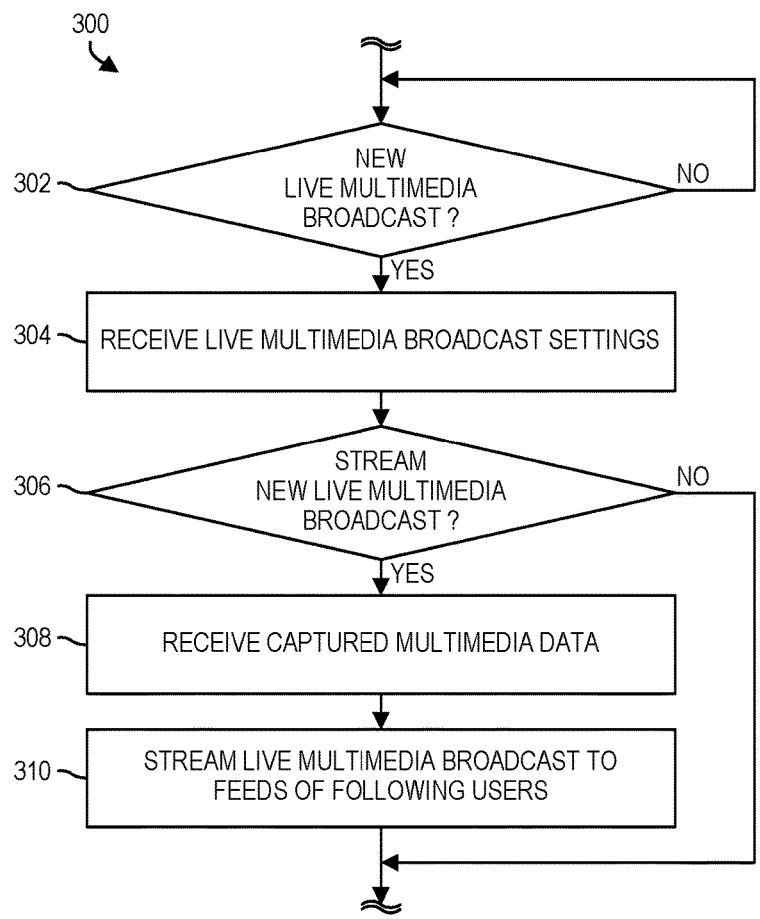
FIG. 3 is a simplified flow diagram of at least one embodiment of a method for streaming a user broadcast that may be executed by the broadcast management server of FIGS. 1 and 2.
Figure 4:
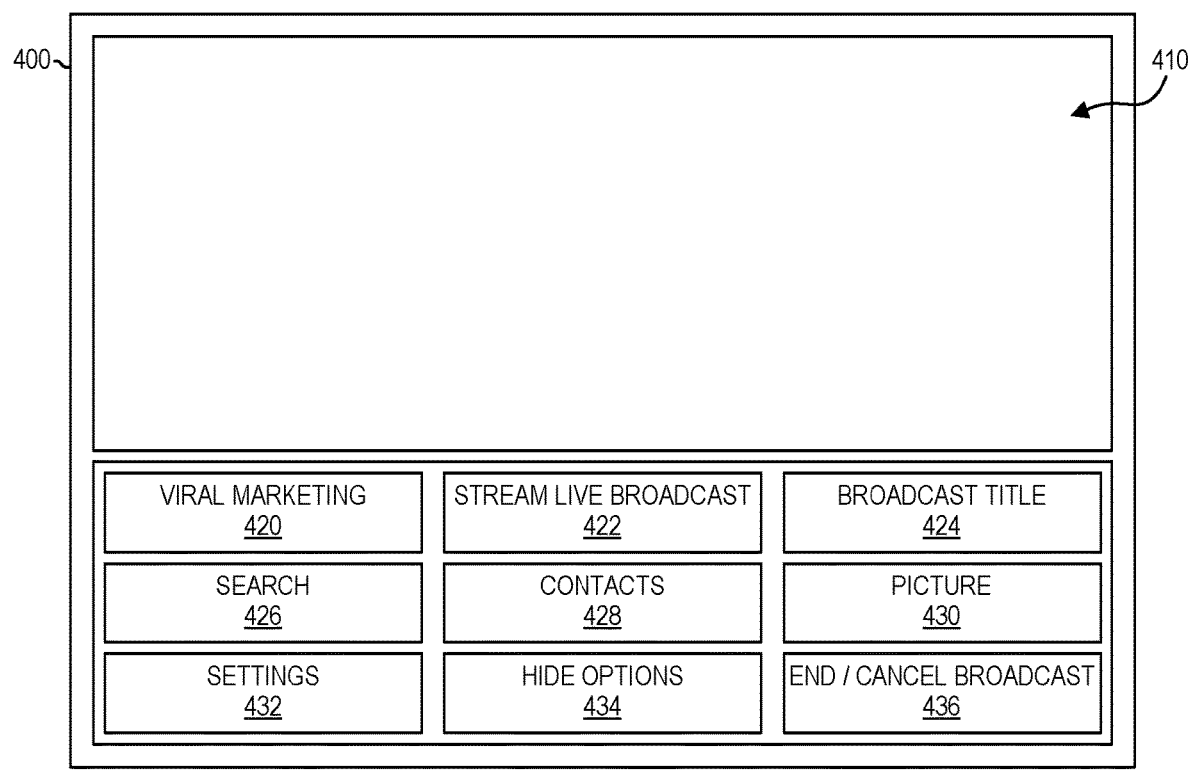
FIG. 4 is an exemplary interface for configuring a user broadcast that may be generated by the broadcast management server of FIGS. 1 and 2.
Figure 5:
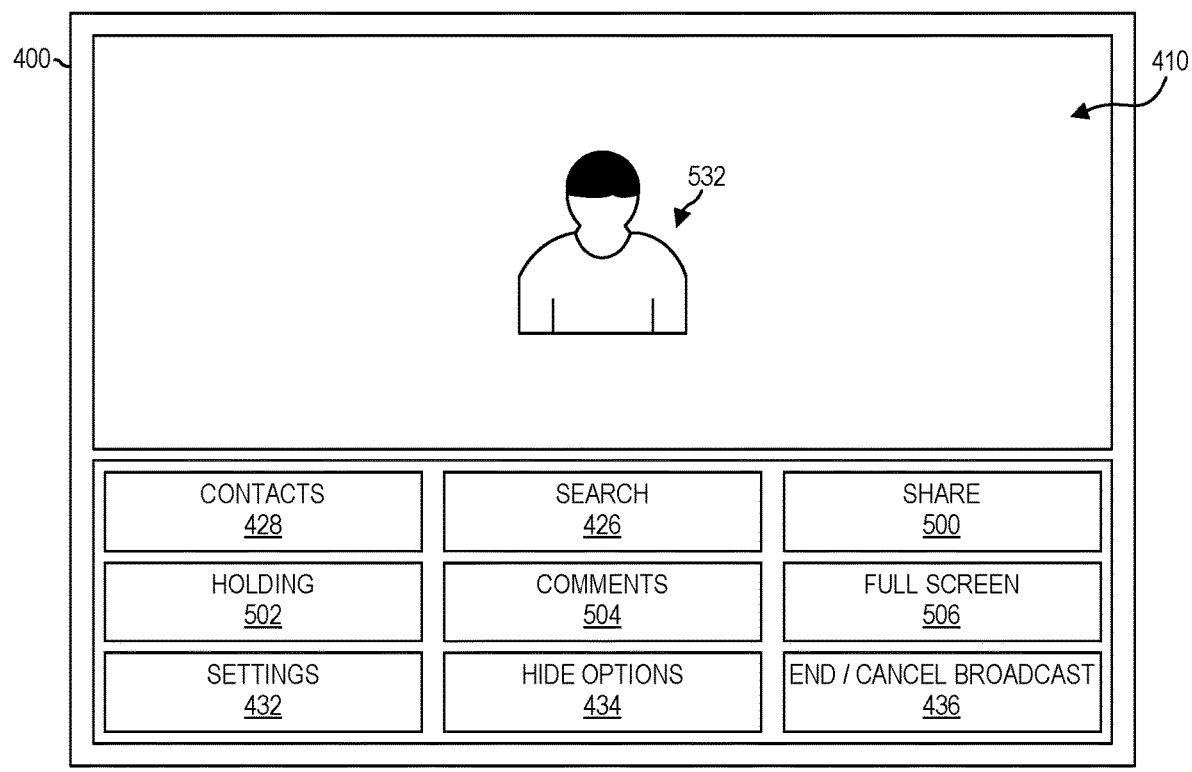
FIG. 5 is an exemplary interface for displaying a streamed user broadcast that may be generated by the broadcast management server of FIGS. 1 and 2.

Referring now to FIG. 3, a method 300 for streaming a multimedia broadcast of a user that may be executed by the broadcast management server 102 begins with decision block 302. In decision block 302, the broadcast management server 102 determines whether creation or initialization of a new multimedia broadcast has been requested by a user 130 via one of the remote computing devices 120. For example, in some embodiments, the broadcast management server 102 may determine whether a new multimedia broadcast has been requested by a primary user such as the user A 132. The new multimedia broadcast requested by the user A 132 may be embodied as a live or previously created multimedia broadcast and may include multimedia data from a large variety of formats including, without limitation, video data, audio data, textual data, sensor data such as GPS or temperature data, or combinations thereof. In some embodiments, the multimedia data can additionally include any other type of data that can be displayed on a computing device such as documents, schematics, or presentations. The new multimedia broadcast may be produced natively or in a pre-rendered format suitable for viewers (e.g., via the remote computing devices 120) without software to natively render such broadcast. It should be appreciated that although the user A 132 requests creation or initialization of a new multimedia broadcast in the illustrative embodiment, any other user 130 (e.g., the user B 134, the user N 136, etc.) may request creation or initialization of a new multimedia broadcast in other embodiments. Referring back to decision block 302, if the broadcast management server 102 determines that a new multimedia broadcast is requested by the user A 132, the method 300 advances to block 304. If, however, the broadcast management server 102 determines instead that a new multimedia broadcast is not requested by the user A 132, the method 300 loops back to decision block 302 and the broadcast management server 102 monitors for a request for a new multimedia broadcast.

In block 304, the broadcast management server 102 receives broadcast settings and/or configuration options corresponding to the new multimedia broadcast requested. The broadcast settings and/or configuration options corresponding to the new multimedia broadcast requested may be received from the user A 132 via one of the remote computing devices 120. In some embodiments, the broadcast management server 102 may generate one or more interfaces (e.g., web pages, proprietary application interfaces, etc.) configured to enable the user A 132 to provide various broadcast settings and/or configuration options associated with the requested new multimedia broadcast via one or more of the remote computing devices 120. For example, as illustratively shown in FIG. 4, the broadcast management server 102 may generate an interface 400 for configuring, displaying, and managing a new multimedia broadcast.

In some embodiments, the interface 400 includes one or more input fields and/or user-selectable objects or options (e.g., buttons, slider bars, drop-down menus, checkboxes, etc.) configured to enable the user A 132 to provide broadcast settings and/or configuration options for a new multimedia broadcast. For example, the interface 400 may include one or more input fields and/or user-selectable objects configured to enable the user A 132 to configure advertising options (e.g., the viral marketing control 420), request that the new multimedia broadcast be streamed (e.g., the stream live broadcast control 422), change the title of the new multimedia broadcast (e.g., the broadcast title control 424), and search for and/or select contacts or entities to receive or be invited to participate in the new multimedia broadcast (e.g., the search control 426 and the contacts control 428). Additionally, in some embodiments, the interface 400 may include one or more input fields and/or user-selectable objects configured to enable the user A 132 to capture or configure a background picture to be shared or embedded and/or superimposed within the new multimedia broadcast (e.g., the picture control 430), configure settings associated with participation requests (e.g., the settings control 432), hide the input fields and/or user-selectable objects (e.g., the hide options control 434), and end or cancel the new multimedia broadcast (e.g., the end/cancel broadcast control 436). Additionally, in some embodiments and as discussed in more detail below, the interface 400 may include a display area 410, which may be configured to provide feedback to the user A 132 and/or display a video or graphical representation (e.g., a live video stream, a still image, an icon, an avatar, etc.) of the user A 132 while the new multimedia broadcast is being streamed.

Referring back to FIG. 3, in decision block 306, the broadcast management server 102 determines whether the user A 132 has requested that the new multimedia broadcast be streamed to one or more other users 130 (e.g., the user B 134, the user N 136, etc.). To do so, in some embodiments, the broadcast management server 102 may determine whether data indicative of the user A 132 selecting and/or interacting with an input field and/or user-selectable object of the interface 400 is received from one or more of the remote computing devices 120. For example, the broadcast management server 102 may determine whether data indicative of the user A 132 selecting and/or interacting with the stream live broadcast option 422 of the interface 400 is received. If, in decision block 306, the broadcast management server 102 determines that the user A 132 has requested that the new multimedia broadcast be streamed to one or more other users 130, the method 300 advances to block 308. If, however, the broadcast management server 102 determines instead that the user A 132 has not requested that the new multimedia broadcast be streamed to one or more other users 130, the method 300, or an instance thereof, terminates.

In block 308, the broadcast management server 102 receives multimedia data captured of the user A 132. As discussed, the multimedia data may be embodied as, without limitation, video data, audio data, textual data, sensor data such as GPS or temperature data, or combinations thereof. For example, in some embodiments, the multimedia data may be embodied as live video data captured of the user A 132. In such embodiments, the live video data may be captured by a camera or video sensor of the remote computing device 120 operated by the user A 132. In some embodiments, the broadcast management server 102 continuously receives the live video data (or other multimedia data) from the remote computing device 120 operated by the user A 132. It should be appreciated that the broadcast management server 102 may receive the live video data and/or the multimedia data periodically according to any suitable time or transmission interval.

In block 310, the broadcast management server 102 may stream the new multimedia broadcast to one or more other users 130 (e.g., the user B 134, the user N 136, etc.) via the remote computing devices 120. In some embodiments, the broadcast management server 102 may stream the new multimedia broadcast to each of the other user's 130 broadcast feed (e.g., the new broadcasts feed interface 1200 illustratively shown in FIG. 12). In such embodiments, the new multimedia broadcast streamed to the other users 130 and/or their corresponding new broadcast feeds 1200 may include the multimedia data (e.g., the live video data, etc.) captured of the user A 132 via the remote computing device 120 operated by the user A 132.

As discussed, in some embodiments, the broadcast management server 102 generates the interface 400, which may include the display area 410 for providing feedback to the user A 132 during creation and/or initialization of the new multimedia broadcast. The display area 410 of the interface may also be configured to display a video or graphical representation (e.g., a live video stream, a still image, an icon, an avatar, etc.) of the user A 132 while the new multimedia broadcast is being streamed. For example, as illustratively shown in FIG. 5, the display area 410 of the interface 400 may be configured to display a live video representation 532 of the user A 132 while the new multimedia broadcast is being streamed. Additionally, while the new multimedia broadcast is being streamed, the interface 400 provided by the broadcast management server 102 may include one or more input fields and/or user-selectable objects or options configured to enable the user A 132 to change and/or provide broadcast settings and/or configuration options associated with the new multimedia broadcast being streamed. It should be appreciated that one or more of the input fields and/or user-selectable objects provided while the multimedia broadcast is being streamed may be the same or substantially similar to the input fields and/or user-selectable objects provided while the user A 132 is configuring a new multimedia broadcast. In some embodiments, however, one or more of the input fields and/or user-selectable objects provided while the multimedia broadcast is being streamed may differ from the input fields and/or user-selectable objects provided while the user A 132 is configuring a new multimedia broadcast. For example, as illustratively shown, the interface 400 provided while the multimedia broadcast is being streamed may include one or more input fields and/or user-selectable objects configured to enable the user A 132 to share a link or generate a notification to the other users 130 informing that the multimedia broadcast is being streamed (e.g., the share control 500), view requests from other users 130 to participate in the multimedia broadcast being streamed transferred to a holding queue (e.g., the holding control 502), view or respond to one or more comments associated with the multimedia broadcast being streamed (e.g., the comments control 504), and take control of a multi-user multimedia broadcast being streamed (e.g., the full screen control 506).

Figure 6:
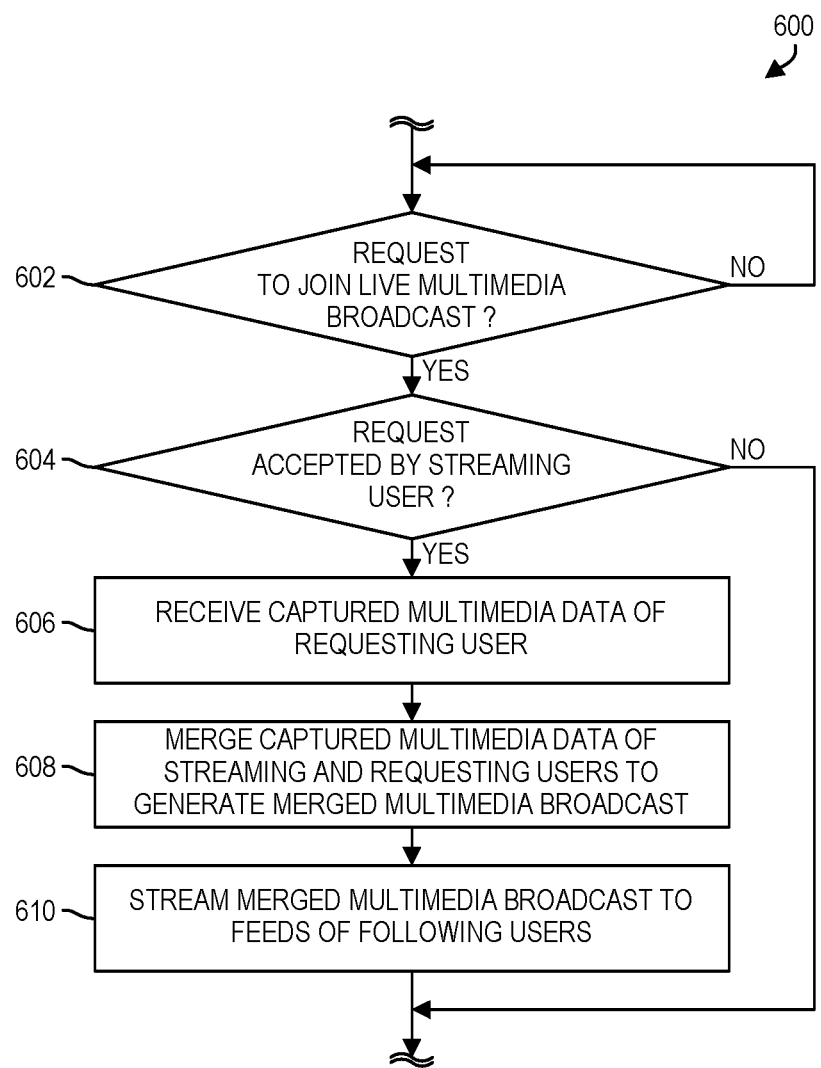
FIG. 6 is a simplified flow diagram of at least one embodiment of a method for merging user broadcasts that may be executed by the broadcast management server of FIGS. 1 and 2.

Referring now to FIG. 6, a method 600 for merging multimedia broadcasts of multiple users that may be executed by the broadcast management server 102 begins with decision block 602. In decision block 602, the broadcast management server 102 determines whether a request to join or participate in the multimedia broadcast of one user 130 (e.g., a streaming user) is received from another user 130 (e.g., a requesting user) via one or more of the remote computing devices 120. For example, in some embodiments, the broadcast management server 102 may determine whether a request to join or participate in the streaming multimedia broadcast of the user A 132 is received from the user B 134. It should be appreciated that the broadcast management server 102 may also determine whether a request to join or participate in a multimedia broadcast being streamed is received from any other user 130 (e.g., the user N 136, etc.) in other embodiments. If, in decision block 602, the broadcast management server 102 determines that a request to join or participate in the multimedia broadcast is received, the method 600 advances to decision block 604. If, however, the broadcast management server 102 determines instead that a request to join or participate in a multimedia broadcast being streamed is not received, the method 600 loops back to decision block 602 and the broadcast management server 102 monitors for the receipt of a request to join or participate in a multimedia broadcast being streamed.

In decision block 604, the broadcast management server 102 determines whether the request by the user B 134 (e.g., the requesting user) to join in the multimedia broadcast of the user A 132 (e.g., the streaming user) is accepted by the user A 132 (e.g., the streaming user). To do so, in some embodiments, the broadcast management server 102 may generate one or more interfaces (e.g., web pages, proprietary application interfaces, etc.) configured to enable the user A 132 to accept or reject the request from the user B 134 to join or participate in their streaming multimedia broadcast. For example, as illustratively shown in FIG. 8A, the interface 400 generated by the broadcast management server 102 may be configured to provide the user A 132 with a popup window 800 or other dialog including options and/or controls for enabling the user A 132 to accept (e.g., the accept control 802) or reject (e.g., the reject control 804) the participation request received from the user B 134. In embodiments in which the broadcast management server 102 determines that the user A 132 rejects the request to participate in the multimedia broadcast received from the user B 134, the broadcast management server 102 may prevent the user B 134 from participating in the multimedia broadcast of the user A 132. Additionally, the popup window 800 provided to the user A 132 may also include an option or control for enabling the user A 132 to place the participation request received from the user B 134 in a holding queue (e.g., the hold control 806). The popup window 800 provided to the user A 132 may further include a video or graphical representation 834 (e.g., a still image, an icon, an avatar, a live video stream, etc.) of the user B 134, which may be used by the user A 132 to identify the user B 134 and/or accept, reject, or place the request received from the user B 134 in the holding queue.

As discussed, in some embodiments, the broadcast management server 102 determines whether the user A 132 places or transfers the participation request received from the user B 134 into a holding queue. In such embodiments, the broadcast management server 102 manages the holding queue based on input received from the user A 132. For example, the broadcast management server 102 may enable the user A 132 to view, change the order, or accept participation requests received from one or more other users 130 placed in the holding queue. It should be appreciated that the broadcast management server 102 may enable the user A 132 to perform other management functions on the participation requests in the holding queue. For example, the broadcast management server 102 may enable the user 132 to add a participation request, rename a participation request, and/or drop a participation request from the holding queue. In embodiments in which the broadcast management server 102 determines that the user A 132 places or transfers the participation request received from the user B 134 into a holding queue, the broadcast management server 102 may suppress and/or delay acceptance of the participation request received from the user B 134 for a configurable time interval or until a reference event occurs (e.g., the user A 132 accepts the participation request, the multimedia broadcast is terminated, etc.).

Referring back to FIG. 6, if in decision block 604, the broadcast management server 102 determines that the request by the user B 134 (e.g., the requesting user) to join in the multimedia broadcast of the user A 132 (e.g., the streaming user) is not accepted by the user A 132 (e.g., the streaming user), the method 600, or an instance thereof, terminates. If, however, the broadcast management server 102 determines instead that the request by the user B 134 to join the multimedia broadcast of the user A 132 is accepted, the method 600 advances to block 606.

In block 606, the broadcast management server 102 receives multimedia data captured of the user B 134. As discussed, the multimedia data may be embodied as, without limitation, video data, audio data, textual data, sensor data such as GPS or temperature data, or combinations thereof. For example, in some embodiments, the multimedia data may be embodied as live video data captured of the user B 134. In such embodiments, the live video data may be captured by a camera or video sensor of a remote computing device 120 operated by the user B 134. In some embodiments, the broadcast management server 102 continuously receives the live video data (or other multimedia data) from the remote computing device 120 operated by the user B 134. It should be appreciated that the broadcast management server 102 may receive the live video data and/or the multimedia data periodically according to any suitable time or transmission interval.

In block 608, the broadcast management server 102 merges multimedia data captured of the user A 132 and received from the remote computing device 120 operated by the user A 132 with the multimedia data captured of the user B 134 and received from the remote computing device 120 operated by the user B 134. In doing so, the broadcast management server 102 generates a merged multimedia broadcast that includes multimedia data received from both of the user A 132 and the user B 134. In embodiments in which the multimedia data captured of the user A 132 and the multimedia data captured of the user B 134 is embodied as live video data, the merged multimedia broadcast generated by the broadcast management server 102 may be embodied as a merged live video stream. In such embodiments, the merged live video stream includes a plurality of frames. Each frame of the merged live video stream may be split into a first frame portion and a second frame portion. In some embodiments, the first frame portion of each frame may include the live video data captured of the user A 132 and the second frame portion may include the live video data captured of the user B 134. It should be appreciated that each frame of the merged live video stream may be split into any number of portions based on the number of users 130 participating in the merged live video stream.

In block 610, the broadcast management server 102 streams the merged multimedia broadcast to one or more other users 130 (e.g., the user B 134, the user N 136, etc.) via the remote computing devices 120. The merged multimedia broadcast streamed to the other users 130 includes both the multimedia data (e.g., the live video data, etc.) captured of the user A 132 and the multimedia data (e.g., the live video data, etc.) captured of the user B 134. Additionally, in some embodiments, the broadcast management server 102 streams the merged multimedia broadcast to a broadcast feed of each of the other users 130. For example, as illustratively shown in FIG. 12, the broadcast management server 102 may stream the merged multimedia broadcast to a broadcast feed 1200 of another user 130 (e.g., a user D). As discussed in more detail below, the broadcast feed of the other user 130 (e.g., the user D) may include a display area 1212 configured to display a video or graphical representation 532, 834 (e.g., a live video stream, a still image, an icon, an avatar, etc.) of each of the user A 132 and the user B 134 while the merged multimedia broadcast is being streamed. Additionally, in some embodiments, the merged multimedia broadcast may be displayed or presented to the user A via the interface 400. For example, as illustratively shown in FIG. 8B, the display area 410 of the interface 400 may be configured to display a live video representation 532 of the user A 132 and a live video representation 834 of the user B 134 while the merged multimedia broadcast is being streamed.

Figure 7:
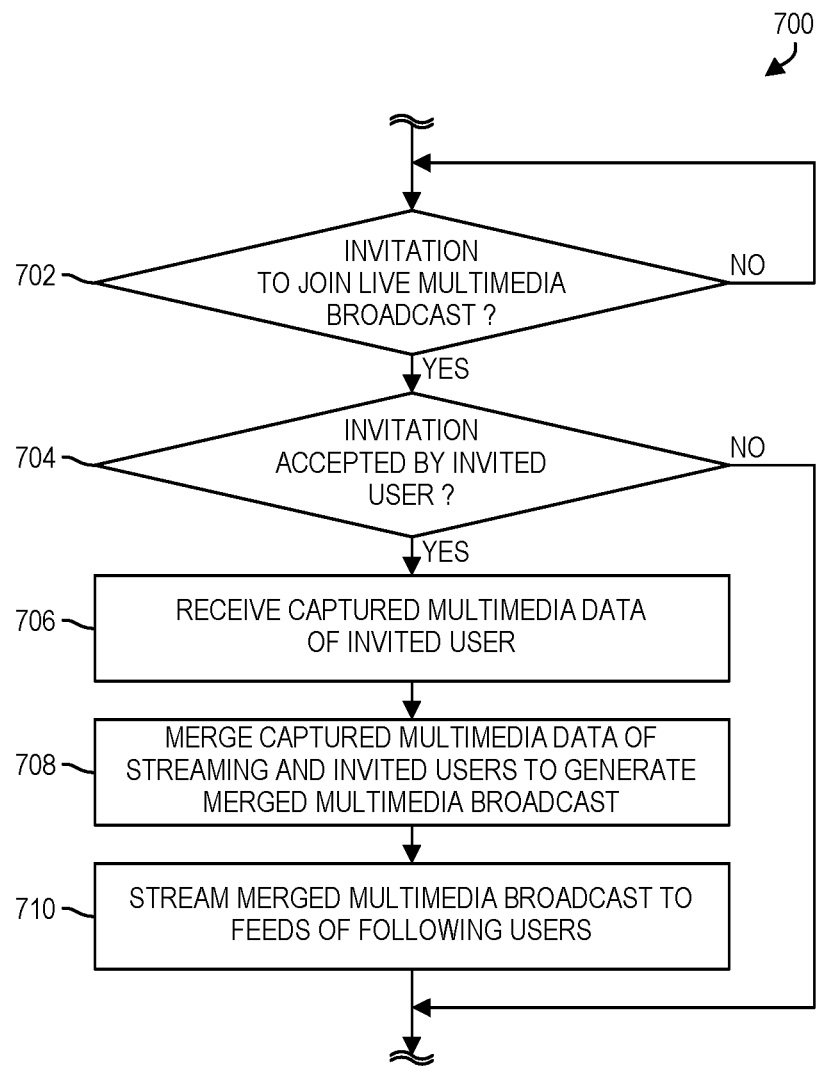
FIG. 7 is a simplified flow diagram of at least one other embodiment of a method for merging user broadcasts that may be executed by the broadcast management server of FIGS. 1 and 2.
Figure 8A:
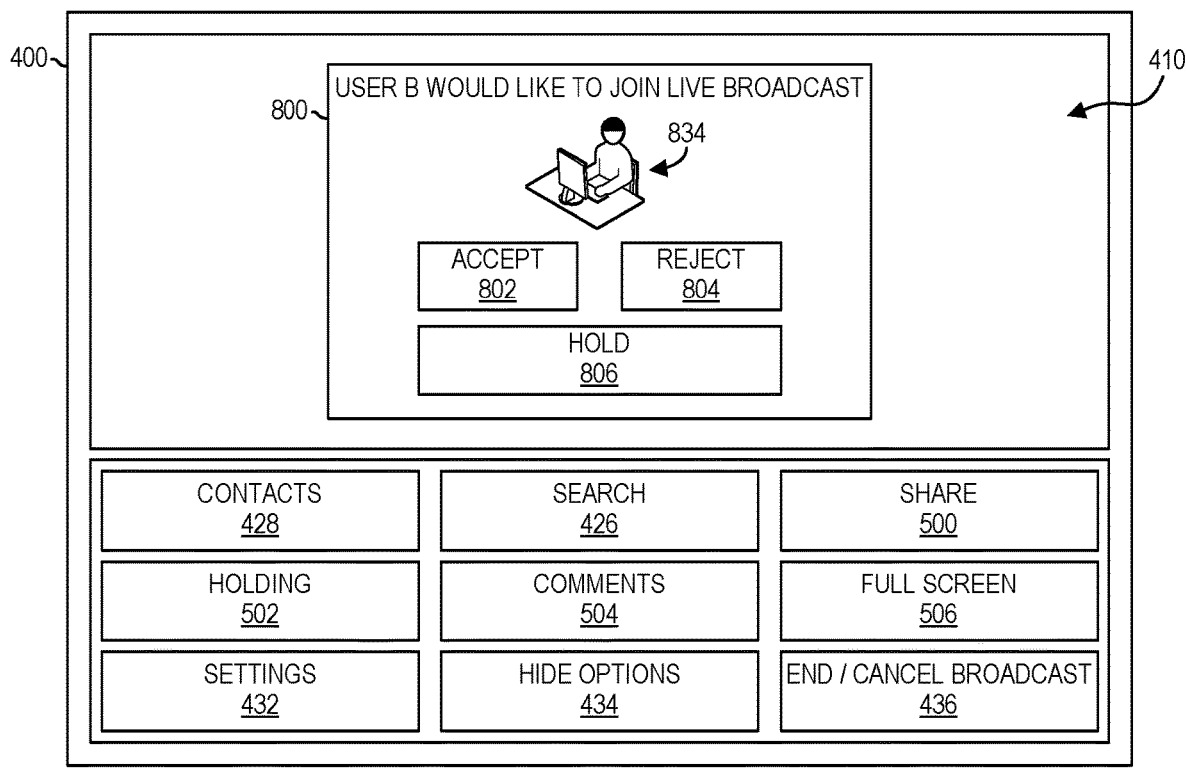
FIGS. 8A-8B are exemplary interfaces for merging user broadcasts that may be generated by the broadcast management server of FIGS. 1 and 2.
Figure 8B:
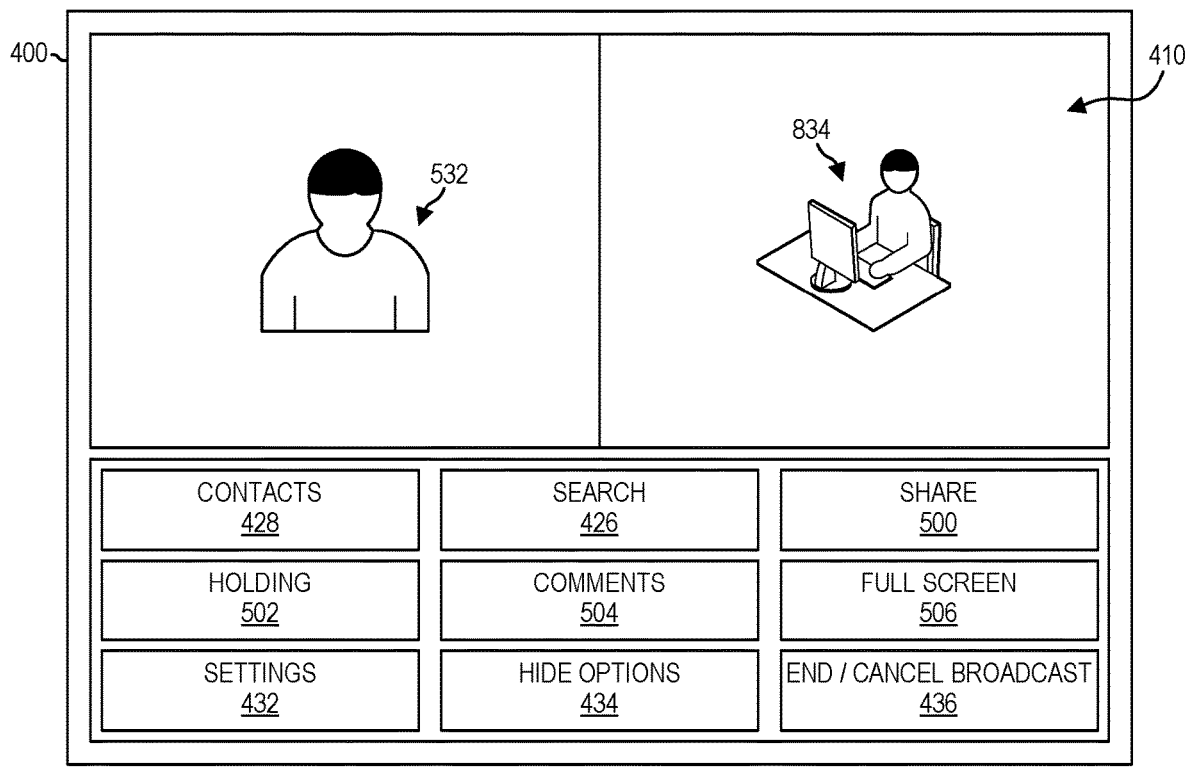

Referring now to FIG. 7, another method 700 for merging multimedia broadcasts of multiple users that may be executed by the broadcast management server 102 begins with decision block 702. In decision block 702, the broadcast management server 102 determines whether an invitation for one user 130 (e.g., an invited user) to join or participate in the multimedia broadcast of another user 130 (e.g., a streaming user) is received via one or more of the remote computing devices 120. For example, in some embodiments, the broadcast management server 102 may determine whether an invitation to the user B 134 to join or participate in the streaming multimedia broadcast of user A 132 is received from the user A 132. It should be appreciated that the broadcast management server 102 may also determine whether an invitation to join or participate in a multimedia broadcast being streamed is received from any other user 130 (e.g., the user N 136, etc.) in other embodiments. If, in decision block 702, the broadcast management server 102 determines that an invitation to join or participate in the multimedia broadcast is received, the method 700 advances to decision block 704. If, however, the broadcast management server 102 determines instead that an invitation to join or participate in a multimedia broadcast being streamed is not received, the method 700 loops back to decision block 702 and the broadcast management server 102 monitors for the receipt of an invitation to join or participate in a multimedia broadcast being streamed.

In decision block 704, the broadcast management server 102 determines whether the request by the user A 132 (e.g., the streaming user) to join in the multimedia broadcast of the user A 132 is accepted by the user N 136 (e.g., the invited user). To do so, in some embodiments, the broadcast management server 102 may generate one or more interfaces (e.g., web pages, proprietary application interfaces, etc.) configured to enable the user N 136 to accept or reject the request from the user A 132 to join or participate in their streaming multimedia broadcast. In some embodiments, the invitation and/or the interface(s) generated by the broadcast management server 102 may be forwarded to, or otherwise transmitted to, the remote computing device 120 operated or used by the user N 136. If, in decision block 704, the broadcast management server 102 determines that the invitation by the user A 132 (e.g., the streaming user) to join in their multimedia broadcast is not accepted by the user N 136 (e.g., the invited user), the method 700, or an instance thereof, terminates. If, however, the broadcast management server 102 determines instead that that the invitation by the user A 132 to join in their multimedia broadcast is accepted, the method 700 advances to block 706.

In block 706, the broadcast management server 102 receives multimedia data captured of the user N 136. As discussed, the multimedia data may be embodied as, without limitation, video data, audio data, textual data, sensor data such as GPS or temperature data, or combinations thereof. For example, in some embodiments, the multimedia data may be embodied as live video data captured of the user N 136. In such embodiments, the live video data may be captured by a camera or video sensor of a remote computing device 120 operated by the user N 136. In some embodiments, the broadcast management server 102 continuously receives the live video data (or other multimedia data) from the remote computing device 120 operated by the user N 136. It should be appreciated that the broadcast management server 102 may receive the live video data and/or the multimedia data periodically according to any suitable time or transmission interval.

In block 708, the broadcast management server 102 merges multimedia data captured of the user A 132 and received from the remote computing device 120 operated by the user A 132 with the multimedia data captured of the user N 136 and received from the remote computing device 120 operated by the user N 136. In doing so, the broadcast management server 102 generates a merged multimedia broadcast that includes multimedia data received from both of the user A 132 and the user N 136. In embodiments in which the multimedia data captured of the user A 132 and the multimedia data captured of the user N 136 is embodied as live video data, the merged multimedia broadcast generated by the broadcast management server 102 may be embodied as a merged live video stream. In such embodiments, the merged live video stream includes a plurality of frames. Each frame of the merged live video stream may be split into a first frame portion and a second frame portion. In some embodiments, the first frame portion of each frame may include the live video data captured of the user A 132 and the second frame portion may include the live video data captured of the user N 136. As discussed, it should be appreciated that each frame of the merged live video stream may be split into any number of portions based on the number of users 130 participating in the merged live video stream.

In block 710, the broadcast management server 102 streams the merged multimedia broadcast to one or more other users 130 (e.g., the user B 134, etc.) via the remote computing devices 120. The merged multimedia broadcast streamed to the other users 130 includes both the multimedia data (e.g., the live video data, etc.) captured of the user A 132 and the multimedia data (e.g., the live video data, etc.) captured of the user N 136. Additionally, in some embodiments, the broadcast management server 102 streams the merged multimedia broadcast to a broadcast feed of each of the other users 130. The merged multimedia broadcast may also be displayed or presented to the user A 132 via the interface 400.

Figure 9:
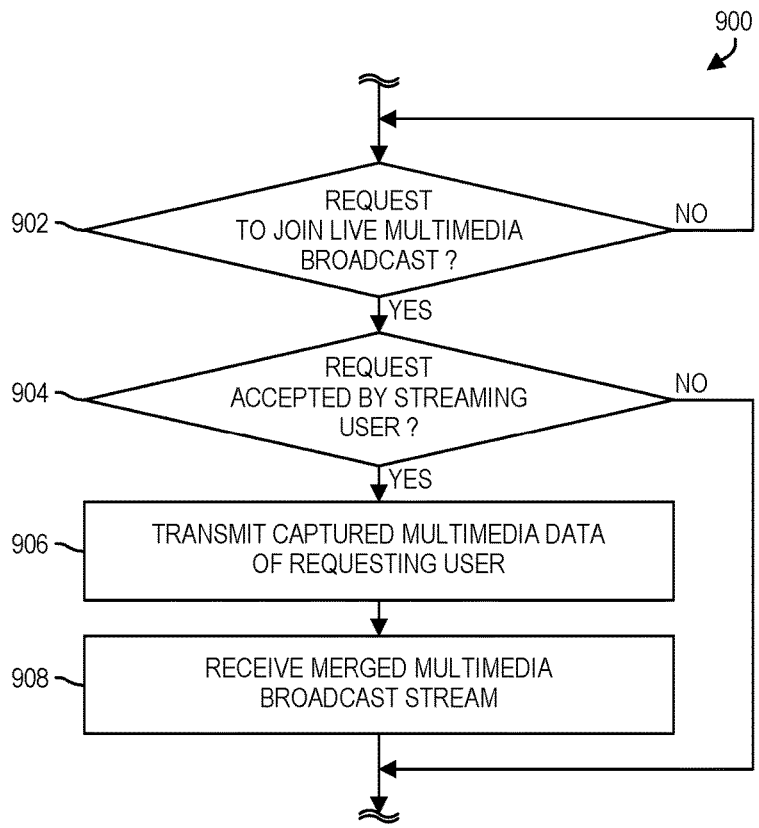
FIG. 9 is a simplified flow diagram of at least one embodiment of a method for requesting participation in a user broadcast and receiving a merged user broadcast that may be executed by the remote computing devices of FIG. 1.
Figure 10:
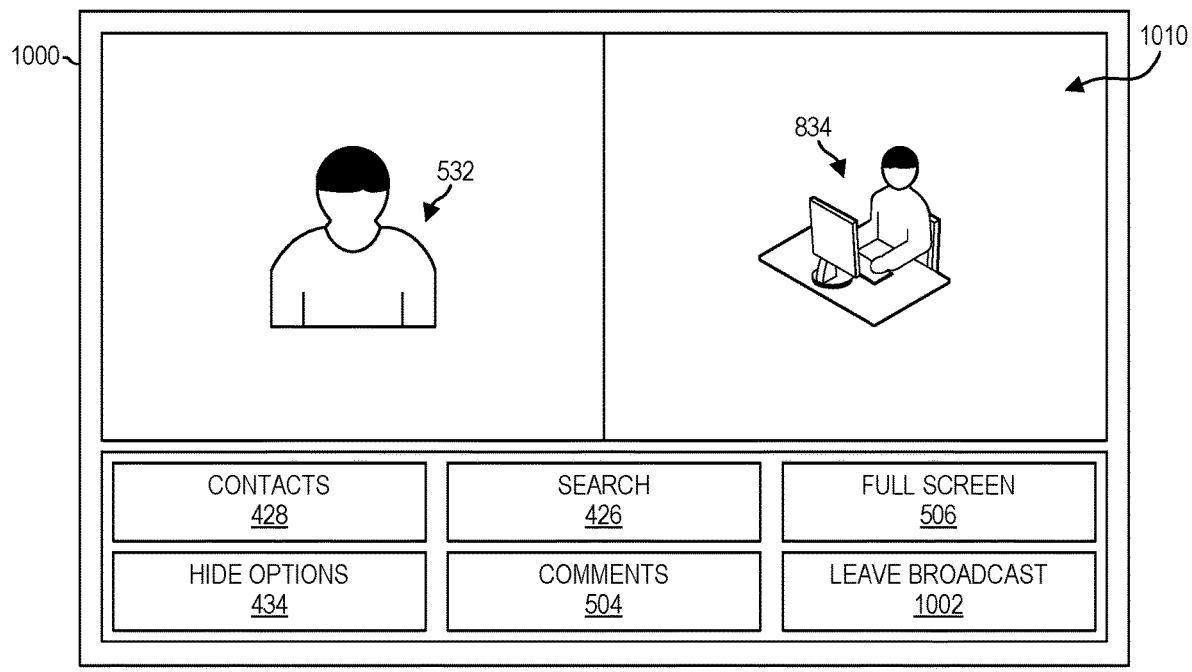
FIG. 10 is an exemplary interface for displaying a received merged user broadcast that may be generated by the remote computing devices of FIG. 1.

Referring now to FIG. 9, a method 900 for requesting participation in a multimedia broadcast and receiving a merged multimedia broadcast that may be executed by a remote computing device 120 begins with decision block 902. In decision block 902, the remote computing device 120 determines whether a request to join or participate in the multimedia broadcast of one user 130 (e.g., a streaming user) is received from a user 130 (e.g., a requesting user) of the remote computing device 120. For example, in some embodiments, the remote computing device 120 may determine whether a request to join or participate in the streaming multimedia broadcast of user A 132 is received from the user B 134. It should be appreciated that the remote computing device 120 may also determine whether a request to join or participate in a multimedia broadcast being streamed is received from any other user 130 (e.g., the user N 136, etc.) of the remote computing device 120, in other embodiments. If, in decision block 902, the remote computing device 120 determines that a request to join or participate in the multimedia broadcast is received, the method 900 advances to decision block 904. If, however, the remote computing device 120 determines instead that a request to join or participate in a multimedia broadcast being streamed is not received, the method 900 loops back to decision block 902 and the remote computing device 120 monitors for the receipt of a request to join or participate in a multimedia broadcast being streamed.

In decision block 904, the remote computing device 120 determines whether the request by the user B 134 (e.g., the requesting user) to join in the multimedia broadcast of the user A 132 (e.g., the streaming user) is accepted by the user A 132 (e.g., the streaming user). To do so, the remote computing device 120 may monitor for data received from the broadcast management server 102 indicative of whether the user A 132 (e.g., the streaming user) accepted the request by the user B 134 (e.g., the requesting user) to join or participate in the multimedia broadcast of the user A 132. If, in decision block 904, the remote computing device 120 determines that the request by the user B 134 to join in the multimedia broadcast of the user A 132 is accepted, the method 900 advances to block 906. If, however, the remote computing device 120 determines instead that the request by the user B 134 to join in the multimedia broadcast of the user A 132 is not accepted, the method 900, or an instance thereof, terminates.

In block 906, the remote computing device 120 transmits multimedia data captured of the user B 134. The multimedia data may be embodied as, without limitation, video data, audio data, textual data, sensor data such as GPS or temperature data, or combinations thereof. For example, in some embodiments, the multimedia data may be embodied as live video data captured of the user B 134. In such embodiments, the live video data may be captured by a camera or video sensor of a remote computing device 120 operated by the user B 134. In some embodiments, the remote computing device 120 operated by the user B 134 continuously transmits the live video data (or other multimedia data) to the broadcast management server 102. It should be appreciated that the remote computing device 120 may transmit the live video data and/or the multimedia data periodically according to any suitable time or transmission interval.

In block 908, the remote computing device 120 receives a merged multimedia broadcast streamed from the broadcast management server 102. The merged multimedia broadcast streamed from the broadcast management server 102 includes both the multimedia data (e.g., the live video data, etc.) captured of the user A 132 and the multimedia data (e.g., the live video data, etc.) captured of the user B 134. In some embodiments, the remote computing device 120 displays or otherwise presents the merged multimedia broadcast. To do so, the remote computing device 120 may generate one or more interfaces (e.g., web pages, proprietary application interfaces, etc.) configured to enable the merged multimedia broadcast to be displayed. For example, as illustratively shown in FIG. 10, the remote computing device 120 may generate an interface 1000 for displaying and interacting with a merged multimedia broadcast. The interface 1000 may include a display area 1010 configured to display a video or graphical representation 532, 834 (e.g., a live video stream, a still image, an icon, an avatar, etc.) of each of the user A 132 and the user B 134 while the merged multimedia broadcast is being received from the broadcast management server 102. Additionally, while the merged multimedia broadcast is being received, the interface 1000 provided by the remote computing device 120 may include one or more input fields and/or user-selectable objects or options configured to enable the user B 134 to interact with the merged multimedia broadcast being received from the broadcast management server 102. It should be appreciated that one or more of the input fields and/or user-selectable objects provided to the user B 134 while the merged multimedia broadcast is being streamed may be the same or substantially similar to the input fields and/or user-selectable objects provided to the user A 132 via the interface 400. In some embodiments, however, one or more of the input fields and/or user-selectable objects provided to the user B 134 while the multimedia broadcast is being received from the broadcast management server 102 may differ from the input fields and/or user-selectable objects provided to the user A 132 via the interface 400. For example, as illustratively shown, the interface 1000 provided while the multimedia broadcast is being received may include one or more input fields and/or user-selectable objects configured to enable the user B 134 to end or leave the merged multimedia broadcast (e.g., the leave broadcast control 1002).

Figure 11:
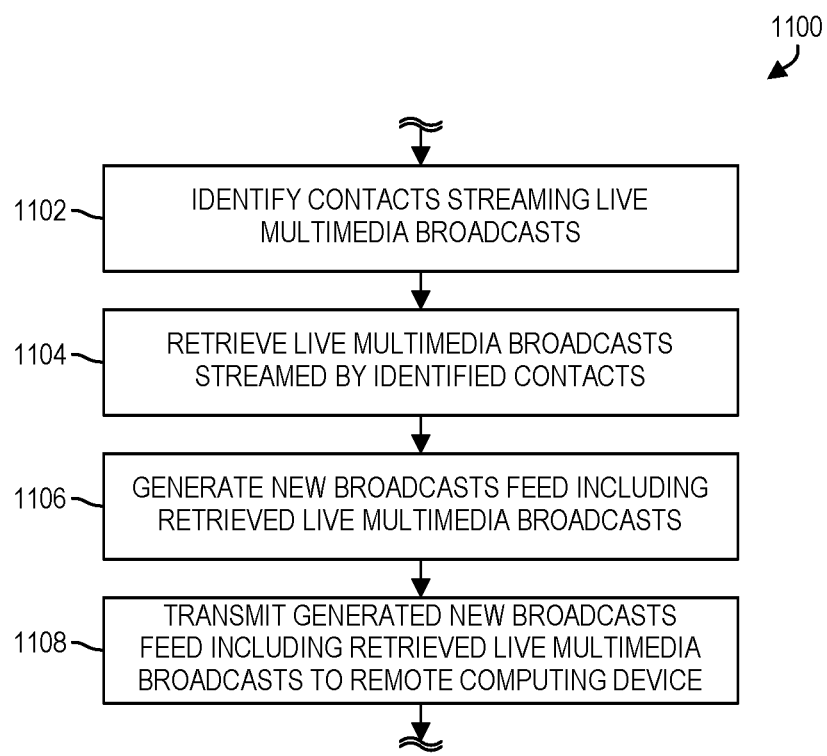
FIG. 11 is a simplified flow diagram of at least one embodiment of a method for generating a broadcast feed that may be executed by the broadcast management server of FIGS. 1 and 2.

Referring now to FIG. 11, a method 1100 for generating a broadcast feed that may be executed by the broadcast management server 102 begins with block 1102. In block 1102, the broadcast management server 102 identifies contacts of a user 130 (e.g., a user D) that are streaming live multimedia broadcasts. To do so, the broadcast management server 120 may identify or determine one or more contacts that the user 130 (e.g., the user D) is following or otherwise knows and that are streaming a live multimedia broadcast. For example, in some embodiments, the broadcast management server 102 may determine or identify the contacts being followed by the user 130 (e.g., the user D) via a contact list corresponding to the user 130. The contact list corresponding to the user 130 (e.g., the user D) may be maintained by the broadcast management server 102 and may include contact information retrieved from a local data storage device of the remote computing device 120 being operated by the user 130, the data storage 110 of the broadcast management server 102, and/or a social media account associated with the user 130. In such embodiments, the broadcast management server 102 may identify those contacts that are currently streaming a live multimedia broadcast.

In block 1104, the broadcast management server 102 retrieves the multimedia broadcast being streamed by each of the contacts (e.g., other users 130) identified. In some embodiments, the broadcast management server 102 may also retrieve an archived multimedia broadcast for a particular identified contact in response to determining that the identified contact is not currently streaming a live multimedia broadcast. The method 1100 then advances to block 1106.

In block 1106, the broadcast management server 102 generates a new broadcasts feed for the user 130 (e.g., the user D) including the multimedia broadcasts being streamed by each of the identified contacts. For example, as illustratively shown in FIG. 12, the broadcast management server 102 generates the broadcast feed 1200 for the user 130 (e.g., user D). The broadcast feed 1200 includes multiple multimedia broadcast posts 1210, 1230. Each multimedia broadcast post 1210, 1230 may include a display area 1212, 1232 configured to display a different video or graphical representation 532, 834, 1236 of a multimedia broadcast corresponding to each contact (e.g., other users 130) that the user 130 (e.g., user D) is following. For example, as illustratively shown, the broadcast feed 1200 may include a broadcast post 1210 having a display area 1212 configured to display a multimedia broadcast (or a merged multimedia broadcast) corresponding to the user A 132. Additionally, the broadcast feed 1200 may include another broadcast post 1230 having a display area 1232 configured to display a different multimedia broadcast (or a merged multimedia broadcast) corresponding to the user N 136. In some embodiments, each multimedia broadcast post 1210, 1230 of the broadcast feed 1200 may also include one or more input fields and/or user-selectable objects or options (e.g., buttons, slider bars, drop-down menus, checkboxes, etc.) configured to enable the user 130 (e.g., the user D) to interact with the corresponding multimedia broadcast. For example, each multimedia broadcast post 1210, 1230 of the broadcast feed 1200 may include one or more input fields and/or user-selectable objects configured to enable the user 130 (e.g., the user D) to request to join or participate in a corresponding multimedia broadcast (e.g., the join broadcast control 1220), "like" or vote for a corresponding multimedia broadcast (e.g., the like broadcast control 1222), comment or view other user's 130 comments regarding a corresponding multimedia broadcast (e.g., the view comments control 1224), and/or share a link or generate a notification informing other users 130 of a corresponding multimedia broadcast (e.g., the share broadcast control 1226).

Referring back to FIG. 11, after generating the new broadcasts feed 1200 for the user 130 (e.g., the user D), the broadcast management server 102 transmits the new broadcasts feed 1200 to the remote computing device 120 of the user 130. The remote computing device 120 of the user 130 (e.g., the user D) may thereafter present or otherwise display the new broadcasts feed 1200 to the user 130.

In various embodiments disclosed herein, a single component can be replaced by multiple components and multiple components can be replaced by a single component to perform a given function or functions. Except where such substitution would not be operative, such substitution is within the intended scope of the embodiments.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

I claim:

1. A broadcast management server for streaming multi-user broadcasts, the broadcast management server comprising a processor executing instructions stored in memory, wherein the instructions cause the processor to:
   (a) receive multimedia data captured of a first user of a plurality of users from a first remote computing device;
   (b) stream a first multimedia broadcast comprising the multimedia data captured of the first user;
   (c) receive a request to participate in the streamed first multimedia broadcast from a second remote computing device;
   (d) receive, from the second remote computing device, multimedia data captured of a second user of the plurality of users in response to a determination that the request to participate in the streamed first multimedia broadcast is accepted;
   (e) merge the multimedia data captured of the first user and the multimedia data captured of the second user to generate a merged multimedia broadcast of the first and second users;
   (f) archive a previously streamed multimedia broadcast, the previously streamed multimedia broadcast comprising multimedia data captured of an inactive user with an inactive user computing device;
   (g) in response to a request from a third remote computing device to receive a broadcast feed interface, automatically identify contacts followed by a third user associated with the third remote computing device, wherein the identified followed contacts comprise the inactive user and one or both of the first user and the second user;
   (h) generate the broadcast feed interface for the third user, the broadcast feed interface comprises a plurality of multimedia posts, wherein a first multimedia post of the plurality of multimedia posts comprises a first display area configured to display the streamed merged multimedia broadcast of the first and second users, and a second multimedia post of the plurality of multimedia posts comprises a second display area configured to display the previously streamed multimedia broadcast in response to a determination that the inactive user is not currently streaming a live multimedia broadcast; and (i) transmit the broadcast feed interface to the third remote computing device for presentation to the third user.

2. The broadcast management server of claim 1, wherein each of the plurality of multimedia posts that are associated with a live multimedia broadcast comprises, when presented to the third user via the broadcast feed interface, a join button that is configured to be selected by the third user to request to participate in the live multimedia broadcast associated with that multimedia post.

3. The broadcast management server of claim 1, wherein the instructions further cause the processor to:
(a) determine whether the request to participate in the streamed first multimedia broadcast is transferred to a hold queue; and
(b) suppress the request to participate in the first streamed multimedia broadcast in response to a determination that the request to participate is transferred to the hold queue.

4. The broadcast management server of claim 1, wherein the multimedia data captured of the first user and the multimedia data captured of the second user comprise live video data captured of the first and second users.

5. The broadcast management server of claim 4, wherein to merge the multimedia data captured of the first user and the multimedia data captured of the second user comprises to merge the live video data captured of the first user and the live video data captured of the second user to generate a merged live video stream comprising a plurality of frames, each frame of the merged live video stream is split into a first frame portion and a second frame portion, wherein the first frame portion of each frame comprises the live video data captured of the first user and the second frame portion comprises the live video data captured of the second user; and wherein to stream the merged multimedia broadcast comprises to stream the merged live video stream.

6. A method for managing streaming multi-user broadcasts, the method comprising, with a processor of a broadcast management server:
(a) receiving multimedia data captured of a first user of a plurality of users from a first remote computing device;
(b) streaming a first multimedia broadcast comprising the multimedia data captured of the first user;
(c) receiving a request to participate in the streamed first multimedia broadcast from a second remote computing device;
(d) receiving, from the second remote computing device, multimedia data captured of a second user of the plurality of users in response to a determination that the request to participate in the streamed first multimedia broadcast is accepted;
(e) merging the multimedia data captured of the first user and the multimedia data captured of the second user to generate a merged multimedia broadcast of the first and second users;
(f) archiving a previously streamed multimedia broadcast, the previously streamed multimedia broadcast comprising multimedia data captured of an inactive user with an inactive user computing device;
(g) in response to a request from a third remote computing device to receive a broadcast feed interface, automatically identifying contacts followed by a third user associated with the third remote computing device, wherein the identified followed contacts comprise the inactive user and one or both of the first user and the second user;
(h) generating the broadcast feed interface for the third user, the broadcast feed interface comprising a plurality of multimedia posts, wherein a first multimedia post of the plurality of multimedia posts comprises a first display area configured to display the streamed merged multimedia broadcast of the first and second users, and a second multimedia post of the plurality of multimedia posts comprises a second display area configured to display the previously streamed multimedia broadcast in response to a determination that the inactive user is not currently streaming a live multimedia broadcast; and
(i) transmitting the broadcast feed interface to the third remote computing device for presentation to the third user.

7. The method of claim 6, wherein each of the plurality of multimedia posts that are associated with a live multimedia broadcast comprises, when presented to the third user via the broadcast feed interface, a join button that is configured to be selected by the third user to request to participate in the live multimedia broadcast associated with that multimedia post.

8. The method of claim 6, further comprising:
(a) determining whether the request to participate in the streamed first multimedia broadcast is transferred to a hold queue; and
(b) suppressing the request to participate in the first streamed multimedia broadcast in response to a determination that the request to participate is transferred to the hold queue.

9. The method of claim 6, wherein the multimedia data captured of the first user and the multimedia data captured of the second user comprise live video data captured of the first and second users.

10. The method of claim 9, wherein merging the multimedia data captured of the first user and the multimedia data captured of the second user comprises merging the live video data captured of the first user and the live video data captured of the second user to generate a merged live video stream comprising a plurality of frames, each frame of the merged live video stream is split into a first frame portion and a second frame portion, wherein the first frame portion of each frame comprises the live video data captured of the first user and the second frame portion comprises the live video data captured of the second user; and wherein streaming the merged multimedia broadcast comprises streaming the merged live video stream.

11. A broadcast management server for streaming multi-user broadcasts, the broadcast management server comprising a processor executing instructions stored in memory, wherein the instructions cause the processor to:
(a) during a live multimedia broadcast session initiated by a first user of a plurality of users, receive multimedia data captured of the first user from a first remote computing device;
(b) stream a first multimedia broadcast comprising the multimedia data captured of the first user;
(c) after a second remote computing device joins the live multimedia broadcast session initiated by the first user, receive, from the second remote computing device, multimedia data captured of a second user of the plurality of users;
(d) merge the multimedia data captured of the first user and the multimedia data captured of the second user to generate a merged multimedia broadcast as part of the first multimedia broadcast;
(e) archive a previously streamed multimedia broadcast, the previously streamed multimedia broadcast comprising multimedia data captured of an inactive user with an inactive user computing device;

(f) in response to a request from a third remote computing device to receive a broadcast feed interface, automatically identify contacts followed by a third user associated with the third remote computing device, wherein the identified followed contacts comprise the inactive user and one or both of the first user and the second user;

(g) generate the broadcast feed interface for the third user, the broadcast feed interface comprising a plurality of multimedia posts, wherein a first multimedia post of the plurality of multimedia posts comprises an indication of the first multimedia broadcast, and, in response to a determination that the inactive user is not currently streaming a live multimedia broadcast, a second multimedia post of the plurality of multimedia posts comprises an indication of the previously streamed multimedia broadcast; and (h) cause the broadcast feed interface to display on the third remote computing device.

12. The broadcast management server of claim 11, wherein each of the plurality of multimedia posts that are associated with a live multimedia broadcast comprises, when presented to the third user via the broadcast feed interface, a join button that is configured to be selected by the third user to participate in the live multimedia broadcast associated with that multimedia post.

13. The broadcast management server of claim 11, wherein the multimedia data captured of the first user and the multimedia data captured of the second user comprise live video data captured of the first and second users.

14. The broadcast management server of claim 13, wherein to merge the multimedia data captured of the first user and the multimedia data captured of the second user comprises to merge the live video data captured of the first user and the live video data captured of the second user to generate a merged live video stream comprising a plurality of frames, each frame of the merged live video stream is split into a first frame portion and a second frame portion, wherein the first frame portion of each frame comprises the live video data captured of the first user and the second frame portion comprises the live video data captured of the second user; and wherein to stream the merged multimedia broadcast as part of the first multimedia broadcast comprises to stream the merged live video stream.

\* \* \* \* \*